United States Patent
Fakhouri et al.

(10) Patent No.: US 9,529,630 B1
(45) Date of Patent: Dec. 27, 2016

(54) CLOUD COMPUTING PLATFORM ARCHITECTURE

(71) Applicant: Pivotal Software, Inc., Palo Alto, CA (US)

(72) Inventors: Onsi Joe Fakhouri, San Francisco, CA (US); Alex Paul Suraci, San Francisco, CA (US); Lon David Varvel, San Francisco, CA (US); Eric James Malm, Sunnyvale, CA (US); Theodore Bradford Young, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 14/602,005

(22) Filed: Jan. 21, 2015

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/50* | (2006.01) | |
| *G06F 9/54* | (2006.01) | |

(52) U.S. Cl.
CPC ............... *G06F 9/5011* (2013.01); *G06F 9/54* (2013.01)

(58) Field of Classification Search
None
See application file for complete search history.

(56) References Cited

U.S. PATENT DOCUMENTS

| | | |
|---|---|---|
| 6,810,517 B2 | 10/2004 | Bond et al. |
| 8,516,505 B2 | 8/2013 | Ergan et al. |
| 2005/0022188 A1 | 1/2005 | Tameshige et al. |
| 2007/0074192 A1 | 3/2007 | Geisinger |
| 2012/0216015 A1 | 8/2012 | Mitra |

(Continued)

OTHER PUBLICATIONS

'Cloud Foundry Documentation,'. [online] "Warden," 2015 [retrieved on Sep. 9, 2015]. Retrieved from the Internet: https://docs.cloudfoundry.org/concepts/architecture/warden.html, 12 pages.

(Continued)

*Primary Examiner* — H S Sough
*Assistant Examiner* — William C Wood
(74) *Attorney, Agent, or Firm* — Fish & Richardson P.C.

(57) ABSTRACT

Methods, systems, and apparatus, including computer programs encoded on computer storage media, for generating recipes having platform-independent, resource-agnostic commands for performing work in a cloud computing platform. One of the systems includes a plurality of execution engines, each execution engine being installed on a particular instance of an underlying computing platform, wherein each execution engine is operable to receive, through an execution engine API by a first execution engine of the plurality of execution engines installed on a first instance of a particular underlying computing platform, a plurality of platform-independent, resource-specific requests from an executor to operate on a resources in an underlying computing platform and in response, perform one or more platform-independent, resource instance-specific operations to operate on a first resource on the first instance of the particular underlying computing platform.

22 Claims, 3 Drawing Sheets

(56) References Cited

U.S. PATENT DOCUMENTS

| | | | | |
|---|---|---|---|---|
| 2012/0266168 A1* | 10/2012 | Spivak | ............... | G06F 9/5055 718/1 |
| 2013/0219411 A1* | 8/2013 | Meeker | ............... | G06F 9/541 719/313 |
| 2013/0311574 A1* | 11/2013 | Lal | ........................ | G06F 9/542 709/206 |
| 2013/0339928 A1 | 12/2013 | Trofin et al. | | |

OTHER PUBLICATIONS

'GitHub,' [online]. "cloudfoundry-incubator / diego-design-notes," 2015 [retrieved on Sep. 9, 2015]. Retrieved from the Internet: https://github.com/cloudfoundry-incubator/diego-design-notes, 7 pages.

'GitHub,' [online]. "pivotal-cf / docs-ops-guide," 2015 [retrieved on Sep. 9, 2015]. Retrieved from the Internet: https://github.com/pivotal-cf/docs-ops-guide, 2 pages.

'Pivotal Docs,' "Cloud Foundry Overview," [retrieved on Sep. 9, 2015]. Retrieved from the Internet: http://docs.pivotal.io/pivotalch/concepts/overview.html, 1 page.

'Wikipedia,' [online]. "Intermediate language," last modified Jul. 19, 2013 [retrieved on Aug. 12, 2013]. Retrieved from the Internet: https://en.wikipedia.org/wiki/Intermediate_representation 3 pages.

'Wikipedia,' [online]. "Pivot language," last modified on Feb. 27, 2013 [retrieved on Aug. 12, 2013]. Retrieved from the Internet: https://en.wikipedia.org/wiki/Pivot_language, 3 pages.

Fakhouri, "Diego Phase 1: Staging in a multiplatform world," The Cloud Foundry Blog, Mar. 13, 2014, 5 pages http://blog.cloudfoundry.org/2014/03/13/diego-phase-1-staging-in-a-multiplatform-world/.

Gloub, "Docker and Broad Industry Coalition Unite to Create Open Container Project," Docker Blog, Jun. 22, 2015, 9 pages.

Sedelnik, "CF Summit Sessions, 'Diego: Re-envisioning the Elastic Runtime'," Blog on All Things Cloud Foundry, Jun. 20, 2014, 12 pages.

The Ruddy Duck, "Deploy Cloud Foundry Elastic Runtime Environment," Jun. 12, 2014, 7 pages.

Vaughan-Nichols, "Docker libcontainer unifies Linux container powers," Linux and Open Source, Jun. 11, 2014, 9 pages.

Williams, "Docker on Diego, Cloud Foundry's New Elastic Runtime," New Stack, 2014, [retrieved on Sep. 9, 2015]. 8 pages.

* cited by examiner

CLOUD COMPUTING PLATFORM ARCHITECTURE

BACKGROUND

This specification relates to cloud computing platforms.

A cloud computing platform is a system of physical computers and software that provides application developers and other consumers a service allowing them to deploy and run applications in a cloud computing system. This service makes it unnecessary for application developers to acquire, build, or maintain complex computing clusters. Rather, an application developer can provide an application and configuration information to the cloud computing platform, and the cloud computing platform can configure and run one or more instances of the application, as requested, in a cloud computing system. Cloud computing platforms may provide robust execution by actively monitoring and maintaining multiple instances of the application.

A cloud computing platform runs user-developed applications in a particular underlying computing platform of the cloud computing system. An underlying computing platform is an environment in which a user-developed application is executed. Different computing platforms can include different hardware, chipset architectures, operating systems, or virtual operating systems, to name just a few examples of the differences that underlying computing platforms may have.

Cloud computing platforms may also execute applications within isolated user spaces of virtual machines (VMs), the isolated user spaces being commonly referred to as software containers, or containers for short. Containers provide security and improve performance by isolating application instances from other applications and from other components of the underlying computing platform without incurring the overhead typically associated with launching a full virtual machine. A particular container implementation is another component of an underlying computing platform.

Cloud computing platforms often host web applications. A web application includes software that is downloaded and run by a web browser. Typically, the web browser acts primarily as a user interface for the web application while significant portions of processing for the web application occur on the cloud computing platform. Examples of application that have been implemented as web applications include word processing applications, image editing applications, and email applications.

SUMMARY

This specification describes, among other things, a cloud computing platform that processes units of work represented by a sequence of platform independent and resource-agnostic commands. In this specification, such a sequence will be referred to as a recipe. The cloud computing platform also can support multiple different underlying computing platforms without altering other components of the system.

In general, one innovative aspect of the subject matter described in this specification can be embodied in systems that include a plurality of executors, each executor being operable to: receive a recipe comprising one or more platform-independent, resource-agnostic commands, each command corresponding to a requested service to be performed by an execution engine on an underlying computing platform, translate each platform-independent, resource-agnostic command of the recipe into one or more platform-independent, resource specific requests that satisfy the requested service on the underlying computing platform and make each of the one or more platform-independent, resource-specific requests to one of the one or more execution engines using a platform-independent execution engine application programming interface (API); and a plurality of execution engines, each execution engine being installed on a particular instance of an underlying computing platform, wherein each execution engine is operable to: receive, through the execution engine API by a first execution engine of the plurality of execution engines installed on a first instance of a particular underlying computing platform, a first platform-independent, resource-specific request from an executor to allocate a resource in an underlying computing platform and in response, perform one or more platform-independent, resource instance-specific operations to allocate a first resource on the first instance of the particular underlying computing platform, receive, through the execution engine API by the first execution engine, a second platform-independent, resource-specific request from the executor to copy a target object into the first resource allocated on the first instance of the particular underlying computing platform and in response, perform one or more platform-independent, resource instance-specific operations to copy the target into the first resource allocated on the first instance of the particular underlying computing platform, and receive, through the execution engine API by the first execution engine, a third platform-independent, resource-specific request from the executor to execute a target executable within the first resource allocated on the first instance of the particular underlying computing platform and in response, perform one or more platform-independent, resource instance-specific operations to execute the target executable within the first resource allocated on the first instance of the particular underlying computing platform. Other embodiments of this aspect include corresponding computer-implemented methods, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Each execution engine is operable to host a respective server that receives requests from an executor to implement the execution engine API. At least two execution engines are installed on two or more different underlying computing platforms. The first platform-independent, resource-specific request comprises a request to allocate a container in an underlying computing platform. A first executor of the plurality of executors installed on a first underlying computing platform and a second executor of the plurality of executors installed on a different second underlying computing platform are both operable to generate a same plurality of platform-independent, resource-specific requests for a particular recipe. A first executor of the plurality of executors is operable to provide a same plurality of platform-independent, resource-specific requests to each of two execution engines installed on different underlying computing platforms. Each of the two execution engines installed on different underlying platforms perform different platform-specific, resource instance-specific operations to satisfy the same plurality of platform-independent, resource-specific requests.

In general, another innovative aspect of the subject matter described in this specification can be embodied in systems that include a plurality of executors, each executor being operable to: receive a recipe comprising one or more platform-independent, resource-agnostic commands, each command corresponding to a requested service to be performed by an execution engine on an underlying computing platform, translate each platform-independent, resource-agnostic command of the recipe into one or more platform-independent, resource specific requests that satisfy the requested service on the underlying computing platform and make each of the one or more platform-independent, resource-specific requests to one of the one or more execution engines using a platform-independent execution engine application programming interface (API); and a plurality of execution engines, each execution engine being installed on a particular instance of an underlying computing platform, wherein each execution engine is operable to:

receive, through the execution engine API by a first execution engine of the plurality of execution engines installed on a first instance of a particular underlying computing platform, a first platform-independent, resource-specific request from an executor to allocate a resource in an underlying computing platform and in response, perform one or more platform-independent, resource instance-specific operations to allocate a first resource on the first instance of the particular underlying computing platform, receive, through the execution engine API by the first execution engine, a second platform-independent, resource-specific request from the executor to copy a target object into the first resource allocated on the first instance of the particular underlying computing platform and in response, perform one or more platform-independent, resource instance-specific operations to copy the target into the first resource allocated on the first instance of the particular underlying computing platform, and receive, through the execution engine API by the first execution engine, a third platform-independent, resource-specific request from the executor to execute a target executable within the first resource allocated on the first instance of the particular underlying computing platform and in response, perform one or more platform-independent, resource instance-specific operations to execute the target executable within the first resource allocated on the first instance of the particular underlying computing platform. Other embodiments of this aspect include corresponding computer implemented methods, apparatus, and computer programs recorded on one or more computer storage devices, each configured to perform the actions of the methods.

The foregoing and other embodiments can each optionally include one or more of the following features, alone or in combination. Each execution engine is operable to host a respective server that receives requests from an executor to implement the execution engine API. At least two execution engines are installed on two or more different underlying computing platforms. The first platform-independent, resource-specific request comprises a request to allocate a container in an underlying computing platform. A first executor of the plurality of executors installed on a first underlying computing platform and a second executor of the plurality of executors installed on a different second underlying computing platform are both operable to generate a same plurality of platform-independent, resource-specific requests for a particular recipe. A first executor of the plurality of executors is operable to provide a same plurality of platform-independent, resource-specific requests to each of two execution engines installed on different underlying computing platforms. Each of the two execution engines installed on different underlying platforms perform different platform-specific, resource instance-specific operations to satisfy the same plurality of platform-independent, resource-specific requests.

Particular embodiments of the subject matter described in this specification can be implemented so as to realize one or more of the following advantages. Representing units of work as recipes having platform-independent, resource-agnostic commands allows developers to specify cloud computing platform tasks in a way that is not overly domain-specific or platform-specific, allowing developers to leverage the cloud computing platform to perform a variety of complex tasks across many domains and diverse platforms. Developers can write arbitrarily complex recipes for performing work in a cloud computing system on a variety of underlying computing platforms. Components of the cloud computing system that are responsible for distributing and monitoring units of work communicate with platform-specific underlying computing platforms via a platform-independent API. Thus, adding support for other underlying computing platforms has a minimal impact on the code base of the cloud computing system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A cloud computing system can process units of work represented as recipes. A recipe is a sequence of platform independent, resource-agnostic commands. The recipes can be implemented as tasks or long-running processes. In this description, a distinction will be made between tasks and long-running processes. Tasks are represented by recipes whose commands a cloud computing system will perform at least once, e.g., download an application into a cloud environment for execution. Long-running processes are represented by recipes whose commands a cloud computing system will perform for an indefinite length of time and possibly in multiple instances, e.g., run multiple instances of an application in the cloud computing system. The cloud computing system can ensure that the correct number of requested instances is running in the face of component failures.

Figure 1:
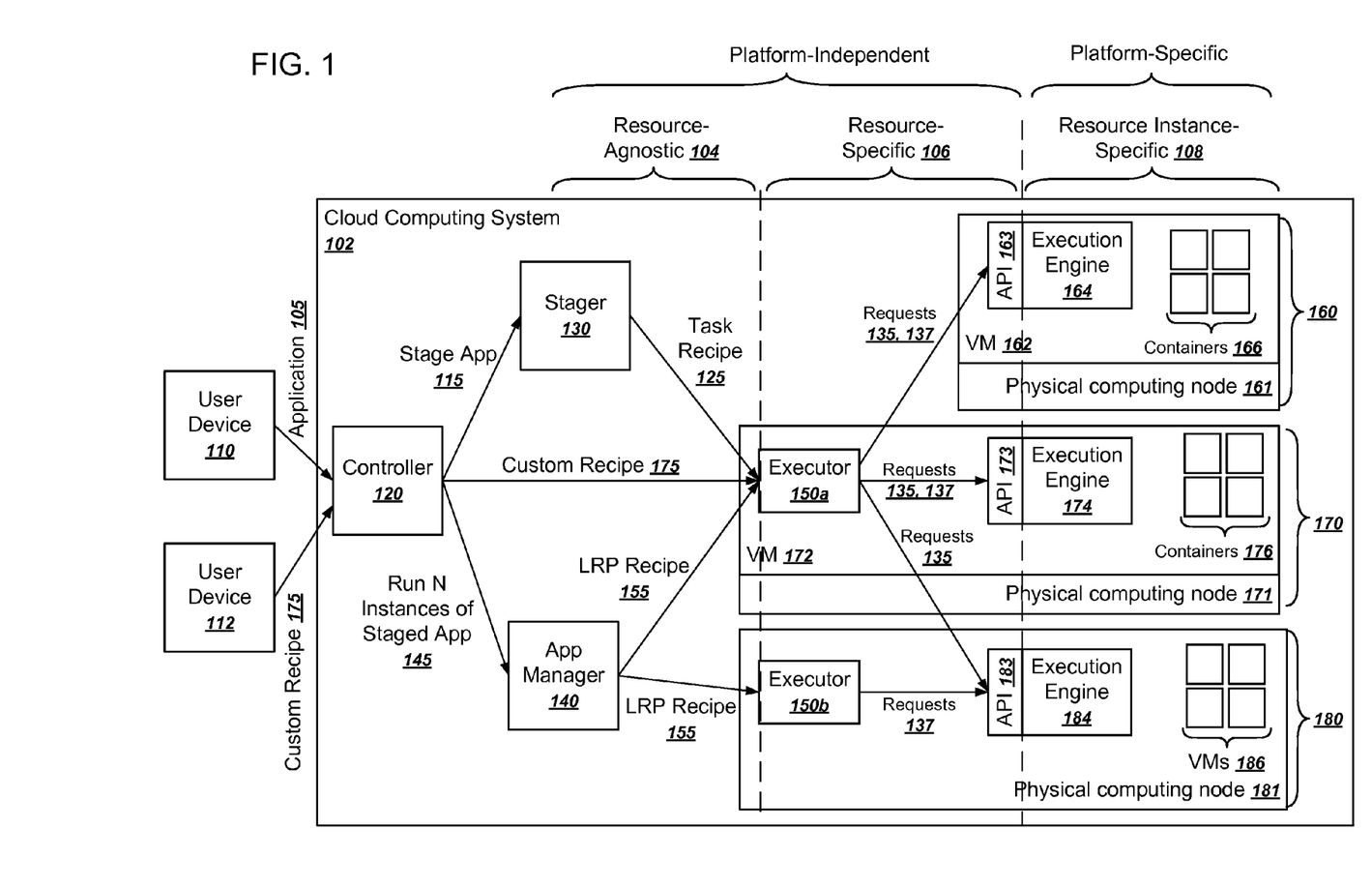
FIG. 1 is a diagram of an example system.

FIG. 1 is a diagram of an example system 100. The system 100 includes user devices 110 and 112 in communication with a cloud computing system 102. The cloud computing system 102 is an example of a cloud computing platform with multiple heterogeneous underlying computing platforms 160, 170, 180.

The cloud computing system 102 includes a controller 120, a stager 130, an application manager 140, and multiple executors 150a-b. Each of these components can be implemented as one or more software modules installed on one or more physical computers or on virtual machines installed on physical computers. Each of these components can be installed as modules in one of the underlying computing platforms 160, 170, or 180. For example, the executor 150a is installed on a VM 172 of the underlying computing platform 170, and the executor 150b is installed on a physical computing node 181 of the underlying computing platform 180.

The heterogeneous underlying computing platforms 160, 170, 180 are hosted by three physical computing nodes 161, 171, 181. Although FIG. 1 shows only three physical computing nodes, a cloud computing system 102 generally will have many more, e.g., hundreds or thousands of physical computing nodes.

A first underlying computing platform 160 includes containers 166 hosted by a Microsoft Windows VM 162 installed on a physical computing node 161. A second underlying computing platform 170 includes containers 176 hosted by a Linux VM 172 installed on a second physical computing node 171. A third underlying computing platform 180 includes virtual machines 186, rather than containers, installed on a third physical computing node 181.

Each computing platform includes an execution engine 164, 174, 184 that manages resources in the underlying computing platforms. The execution engines 164, 174, 184 can be implemented as software modules in the underlying computing platforms.

The executors 150a-b handle communication with the execution engines installed on the underlying computing platforms. Each of the executors 150a-b can be installed on the underlying computing platforms of the cloud computing system 102. For example, the executor 150a is installed as a software module on a VM 172 of the second computing platform 170, and the executor 150b is installed as a software module on the physical computing node 181 of the third underlying computing platform 180. The executors 150a-b can also be installed on computing nodes that do not provide computation services for the cloud computing platform. In some implementations, every instance of an underlying computing platform has at least one executor and an execution engine. In some other implementations, some underlying computing platforms do not have an executor, e.g., the first computing platform 160.

The cloud computing system 102 is organized in a number of distinct layers that facilitate performing work on the heterogeneous underlying computing platforms 160, 170, 180. The use of the term layers does not imply a physical distance, as some components of different layers may be installed on a common underlying computing platform. Furthermore, some components may operate on multiple layers of the cloud computing system 102.

A platform-independent, resource-agnostic layer 104 includes components that process platform-independent, resource-agnostic commands in recipes. Each platform-independent, resource-agnostic command corresponds to a requested service to be performed by an execution engine on an underlying computing platform. A command is platform-independent if the service corresponding to the command can be performed by an execution engine on any of a number of different underlying computing platforms.

A command is resource-agnostic if an execution engine can perform a service corresponding to the command using any appropriate combination of resources on any single underlying computing platform. Thus, a resource-agnostic command may not specify operations that relate to allocating, maintaining, or configuring resources of a particular underlying computing platform.

For example, the stager 130 can use platform-independent, resource-agnostic commands to stage an application. Staging an application for execution in the cloud computing system 102 prepares the application for execution in one or more of the underlying computing platforms 160, 170, 180. Staging an application can include compiling the application using platform-specific build packs. Rather than perform the staging operations itself, the stager 130 can instead generate a single task recipe 125 having platform-independent, resource-agnostic commands that request services to be performed by an execution engine staging the application in one or more of the underlying computing platforms 160, 170, 180. The platform-independent, resource-agnostic commands of the task recipe 125 do not specify what resources will perform the staging operations. Rather, execution engines 164, 174, 184 in each of the underlying computing platforms 160, 170, 180 will handle allocating resources, downloading the appropriate staging executable and build packs, and initiating the staging operations using the allocated resources.

Components in the platform-independent, resource-agnostic layer 104 generate recipes and provide the recipes to components in a platform-independent, resource-specific layer 106 of the cloud computing system 102. The platform-independent, resource-specific layer 106 includes components that generate platform-independent, resource-specific requests that direct an execution engine to effectuate the service requested by each of the platform-independent, resource-agnostic commands of the recipe. In other words, the components of the second platform-independent, resource-specific 106 can translate each platform-independent, resource-specific command into one or more platform-independent, resource-specific requests to be handled by execution engines in the underlying computing platforms.

A request is resource-specific if the request directs an execution engine to operate on a resource in an underlying computing platform. For example, requests can direct an execution engine to allocate a container in an underlying computing platform, download objects into the allocated container, and set limits on CPU, disk, and memory consumption for the allocated container.

A request being platform-independent means that the same request can be provided to any one or more of multiple execution engines on multiple different underlying computing platforms. For example, the executor 150a can make the same series of requests 135 to each of the execution engines 164, 174, 184 on the three underlying computing platforms 160, 170, 180.

The components in the platform-independent, resource-specific layer 106 provide the platform-independent, resource-specific requests to components in a platform-specific, resource instance-specific layer 108 of the cloud-computing system 102. Components in the platform-specific, resource instance-specific layer 108 perform platform-specific, resource instance-specific operations in the underlying computing platforms to satisfy the requests.

For example, in response to receiving a platform-independent, resource-specific request to allocate a container, the execution engine 164 can perform a platform-specific, resource instance-specific operation that allocates a container 166 on the VM 162.

Staging and executing an application in the cloud computing system will illustrate how the layers of the cloud computing system interact. For example, a developer, using user device 110 for example, can provide an application 105 to the cloud computing system 102. The cloud computing system 102 will stage the application 105 for execution in one or more of the underlying computing platforms 160, 170, 180 and execute a number of instances of the application 105 in one or more of the underlying computing platforms 160, 170, 180.

The application 105 can be any appropriate application, e.g., a web application, a content server, or any other appropriate unit of computation. The application 105 can be written in any appropriate programming language, e.g., PHP, Java, Ruby, or Python, to name just a few examples, or in multiple languages.

The developer can also specify parameters for running the application 105, e.g., a number of instances, a desired underlying computing platform, a desired level of resource utilization, and values of one or more environment variables, to name just a few examples. If the developer does not specify such parameters, the cloud computing system 102 can use a default configuration for one or more parameters and environment variables.

The controller 120 receives the application 105 and makes a request 115 to the stager 130 to stage the application. To stage an application, the cloud computing system 102 can import one or more build packs for compiling the application into an executable file on a target underlying computing platform. The result is an executable that can be run in one of the underlying computing platforms 160, 170, or 180.

The stager 230 then generates a task recipe 125 to stage the application 105. For example, the task recipe 125 can specify the following platform-independent, resource-agnostic commands:

Download(application_location, application_destination)
Download(buildpack_location, buildpack_destination)
Run(stager_path, args, environment_vars)
Upload(compiled_application, destination_location)

A Download command requests that an object, identified by a resource location, be downloaded into an underlying computing platform of the cloud computing system 102. The application_location argument specifies a location of the application 105 provided by the developer, and the application_destination specifies a location in the computing platforms 160, 170, 180 to which the application 105 should be downloaded. Similarly, the buildpack_location argument specifies the location of a build pack needed to compile the application 105, and the buildpack_destination argument specifies a location in the computing platforms 160, 170, 180 to which the build packs should be downloaded.

The resource locations and destinations can be specified by any appropriate location designator, e.g., as a file system path or a uniform resource locator (URL). To maintain platform-independence, the system can use a standard format to represent platform-specific file system locations. The execution engines 164, 174, 184 on the respective computing platforms 160, 170, 180 can then convert the standard format locations to a platform-specific locations as appropriate. For example, the application destination can be specified in the recipe as "/home/user/source." An execution engine 164 on the Windows-based computing platform 160 can then convert the application destination to a Windows-specific path, e.g., "C:\Users\User\source".

To further maintain platform independence, the build pack locations may be specified generically, and the execution engines 164, 174, 184 can choose the build packs specifically from the generic location. For example, the build pack location may be specified as a URL "http://example.com/buildpacks." The execution engine 164 will then download a Windows-specific build pack from the provided path.

A Run command requests that a particular executable file be executed in the underlying computing platform. The Run command takes a first argument that specifies the executable file, and any arguments and environment variables for running the executable.

In this example, the Run command has an argument, stagerpath, that specifies a path to a staging utility that will compile the application 105. The Run command also includes arguments for the staging utility. The arguments for the staging utility can include a location of the downloaded application and one or more build packs. The Run command can also accept one or more environment variables for the staging utility.

An Upload command requests that an object in an underlying computing platform be uploaded to a particular destination. Thus, the example Upload command specifies that the compiled application should be uploaded to a particular destination. The destination may also be specified by any appropriate location designator, e.g., as a file system path or a URL.

The stager 130 then provides the generated task recipe 125 for staging the application 105 to the executor 150a. The task recipe 125 need not specify an underlying computing platform that should effectuate the commands of the task recipe 125, nor does the task recipe 125 need to specify what resources are required to effectuate the commands of the task recipe 125.

Instead, the executor 150a translates each platform-independent, resource-agnostic command of the task recipe 125 into one or more platform-independent, resource-specific requests that satisfy the service requested by the command.

The executor 150a then makes each of the generated requests 135 to execution engines on one or more of the computing platforms 160, 170, 180. Each executor 150a-b can make requests to any other execution engine in the cloud computing system 102. However, as described above, in some implementations each underlying computing platform in the system has its own executor.

Each platform-independent, resource-specific request corresponds to one or more platform-specific, resource instance-specific operations to be performed by an execution engine on a particular underlying computing platform. While performing the requests 135, the executor 150a can stream log messages back to the user device 110 so that a developer can monitor the staging process.

For example, for a Download command that requests an application to be downloaded, the executor 150a can make the following three platform-independent, resource specific requests to an execution engine 164 installed on the first computing platform 160: a first request to allocate a container in the underlying computing platform 160, a second request to set resource limits on the allocated container, and a third request to download the application from a specified location into the allocated container.

If the developer specified a desired underlying computing platform, the executor 150a can make requests 135 to only the desired underlying computing platform. If the developer did not specify a desired underlying computing platform, the executor 150*a* can make requests 135 to a default underlying computing platform.

Because the requests 135 are platform-independent, the executor 250 can make the same set of requests 135 to execution engines on each of the first computing platform 160, the second computing platform 170, and the third computing platform 180, which will cause each execution engine to stage the application 105 on each of the underlying computing platforms 160, 170, 180.

The execution engines 164, 174, 184 receive the requests 135, and, in response, perform platform-specific, resource-instance specific operations to satisfy the requests. For example, a platform-independent, resource-specific request might request allocation of a container on an underlying computing platform. When the execution engine 164 on the first underlying computing platform 160 receives the platform-independent, resource-specific request, the execution engine 164 performs one or more platform-specific, resource instance-specific operations to allocate a Windows container 166 on the first underlying computing platform 160. When the execution engine 174 on the second underlying computing platform 170 receives the platform-independent, resource-specific request, the execution engine 174 performs one or more platform-specific, resource instance-specific operations to allocate a Linux container 176 on the second underlying computing platform 170.

As another example, the executor 150*a* can make a request to each execution engine to copy a file into an allocated resource on the underlying computing platforms. Each of the execution engines 164, 174, 184 receive the request and copy the file accordingly. For example, the execution engine 164 will copy the file into one of the Linux containers 166. The execution engine 174 will copy the file into one of the Windows containers 176, and the execution engine 184 will copy the file into one of the Linux VMs 186.

Some underlying computing platforms may lack support for a resource that is the subject of a platform-independent, resource-specific request. For example, the third underlying computing platform 180 does not support containers. The execution engine 184 may still allocate sufficiently equivalent resources on the underlying computing platform 180. For example, the execution engine 184 can allocate a VM 186 instead of a container.

To facilitate platform-independence, the executors 150*a-b* and the execution engines 160, 170, 180 communicate using a platform-independent execution engine application programming interface (API), which can be, e.g., a client/server API. The execution engine API defines a particular function for each of the platform-independent, resource-specific requests. Calling entities using the API, e.g., the executor 150*a*, make requests on the execution engine APIs 163, 173, 183 imported by each particular execution engine 164, 174, 184. Each execution engine then implements the platform-specific, resource instance-specific operations corresponding to each request. The execution engine API can be implemented by any appropriate communication protocol, e.g., hypertext transfer protocol.

In some implementations, each execution engine 164, 174, 184 starts a corresponding server that waits for clients to make requests, e.g., HTTP requests, as the platform-independent, resource-specific requests. The execution engines 164, 174, 184 carry out the platform-specific, resource instance-specific operations according to the received requests and can provide a response back to the executors 150*a-b* when the resource instance-specific operations are complete.

Because of the platform-independent nature of the execution engine API, the executors 150*a-b* can make the same set of requests to each of the three execution engines 164, 174, 184, even though each of the execution engines 164, 174, 184 are installed on different underlying computing platforms and allocate different kinds of resources.

Thus, system administrators can add support for a new underlying computing platform by installing a new execution engine that supports the execution engine API to satisfy the platform-independent, resource-specific requests on the new underlying computing platform. Meanwhile, no code needs to be changed in the executors 150*a-b* or in any other modules of the cloud computing system 102. Rather, the executors 150*a-b* can provide the same set of requests to all newly supported underlying computing platforms to satisfy the services requested by the commands.

The cloud computing system 102 can take steps to ensure that task recipes, e.g., task recipe 125, will be performed at least once. For example, each executor, e.g., the executor 150*a* can monitor the requests 135 to the underlying computing platforms. If one or more operations corresponding to the requests 135 of fail due to a software or hardware failure, the executor 150*a* can provide an indication to the stager 130 that the recipe failed. In response, the stager 130 can restart the staging process by again providing the recipe 125 to the executor 150*a*.

If the requests 135 succeed, the executor 150*a* can provide an indication to the stager 130 that the task recipe 125 has succeeded. By operation of the Upload command, the generated executable application will be stored in a particular location in a data storage subsystem for use by the application manager 140 when launching instances of the application 105.

The stager 130 can then provide an indication to the controller 120 that the commands of the task recipe 125 have successfully been carried out and that the application 105 has been successfully staged.

The controller 120 receives the indication that the stager 130 has successfully staged the application 105. The controller 120 then makes a request 145 to an application manager 140 to launch one or more instances of the application 105. The number of instances will generally correspond to a number of instances requested by the developer, although the number may be capped at a particular value depending on settings of the developer's account with the cloud computing system 102. The request 145 to the application manager 140 can also specify locations of the stored executable applications generated by the staging commands of the task recipe 125.

The application manager 140 receives the request 145 and generates a long-running process (LRP) recipe 155 for running one or more instances of the executable application in the cloud computing system 102. The LRP recipe 155 represents a process that should be executed for an indefinite length of time.

The LRP recipe 155 can specify the following platform-independent, resource-agnostic commands:

Download(executable_application_location, executable_application_destination)

Download(database_location, database_destination)

Run(executable_application_path, args, environment_vars)

Log(executable_application, log_destination)

This LRP recipe 155 includes a first Download command that requests that the executable application be downloaded into an underlying computing platform of the cloud computing system 102. The first Download command specifies a location of the executable application and a destination in the underlying computing platform. The LRP recipe 155 also includes a second Download command that requests downloading a database for use by the executable application into the underlying computing platform to a particular destination in the underlying computing platform.

The LRP recipe 155 also includes a Run command that requests that the specified executable application be executed in the underlying computing platform. The Run command specifies a path to the executable application as well as arguments and environment variables for executing the executable application.

The recipe 155 also includes a Log command that requests log messages from the executable application be streamed to a particular destination.

The application manager 140 then provides the LRP recipe 155 to the executors 150a-b along with indications of how many instances of the application 105 the executors 150a-b should start.

The cloud computing system 102 can use a resource provisioning system for determining how to allocate instances of an application to computing nodes of a particular computing platform. If the developer specified a desired underlying computing platform, the executors 150a-b can launch all desired instances of the application 105 on the desired computing platform. If the developer did not specify a desired underlying computing platform, the executors 150a-b can launch the instances on a default computing platform, or launch some instances on the first computing platform 160, some instances on the second computing platform 170, and some instances on the third computing platform 180.

Each executor 150a-b receives the LRP recipe 155 and translates the commands of the LRP recipe 155 into a sequence of platform-independent, resource-specific requests for launching instances of the application.

For example, for the first Download command of the LRP recipe 155, the executor 150a can make the following requests to the execution engine 164: a first request to allocate a container, a second request to start the container, a third request to set default resource limits on the container, and a fourth request to download the executable application into the allocated container. For the second Download command of the LRP recipe 155, the executor 150a can make a request to the execution engine 164 to download the database into the allocated container. For the Run command of the LRP recipe 155, the executor 150a can make a request to the execution engine 164 to initiate execution of the application in the allocated container. And finally, for the Log command of the LRP recipe 155, the executor 150a can make the following requests to the execution engine 164: a first request to download a default logging utility, a second request to start the logging utility, attach to the executing application, and stream log messages to the target destination, e.g., back to the user device 210.

Each executor 150a-b can monitor the application instances. If one or more application instances fail, the executors 150a-b can provide an indication to the application manager 140 that an LRP has failed. In response, the application manager 140 can start another instance by again providing the LRP recipe 155 to one of the executors 150a-b.

In addition to recipes generated automatically by the stager 230 or the application manager 240, the cloud computing system 202 also supports the execution of custom recipes of arbitrary complexity written by developers by hand or using other tools.

For example, a developer using user device 112 can provide a custom recipe 175 to the controller 120. The controller 120 can then directly provide the custom recipe 175 to the executor 150a, which will then translate the custom recipe 175 into a series of platform-independent, resource-specific requests to one or more of the computing platforms 160, 170, 180.

The ability to support custom recipes allows developers to use the cloud computing system 102 to perform arbitrarily complex tasks in a platform-independent way. For example, a developer can provide a custom recipe 175 that downloads and launches a domain name system (DNS) server within one of the computing platforms using the following commands:

Download(DNS_server_location, DNS_server_destination)

Run(DNS_server_path, args, environment_vars)

As another example, a developer can write a custom recipe 175 to stage, execute, and monitor software code that implements all of the components of the cloud computing system 102 itself. In other words, the developer can write a recipe that stages software implementing the controller 120, stager 130, application manager 140, and executors 150a-b, and executes the staged controller, stager, application manger, and executors on any of the underlying computing platforms 160, 170, 180 of the cloud computing system 102.

Figure 2:
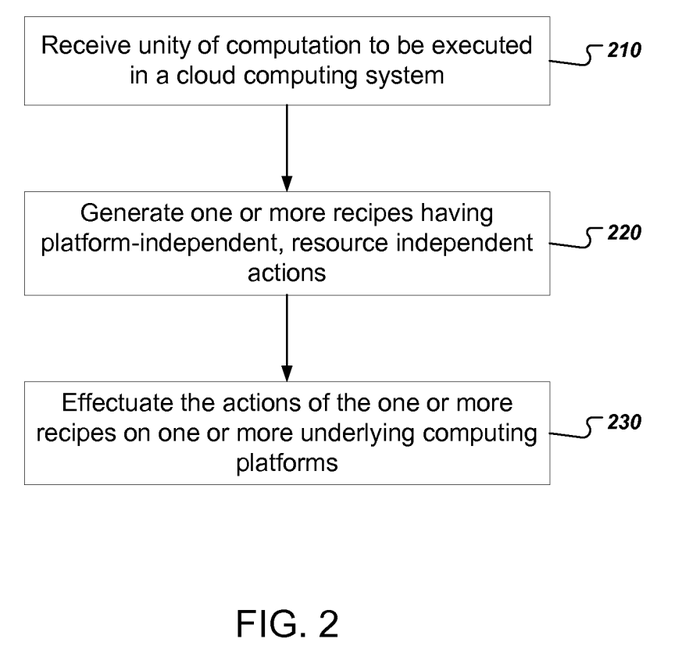
FIG. 2 is a flow chart of an example process for generating recipes having platform-independent, resource-agnostic commands.

FIG. 2 is a flow chart of an example process for generating recipes having platform-independent, resource-agnostic commands. The process can be implemented by one or more computer programs installed on one or more computers. The process will be described as being performed by an appropriately programmed system of one or more computers, e.g., the stager 130 or the application manager 140 as described above with reference to FIG. 1.

The system receives a unit of computation to be executed in a cloud computing system (210). The unit of computation can be a script, one or more source code files, an executable file, or any other appropriate unit of computation to be performed in an underlying computing platform of a cloud computing system.

The system generates one or more recipes having platform-independent, resource agnostic commands (220). For example, the system can generate a first task recipe to stage the application and a second LRP recipe to execute an instance of the application.

The system can use a recipe template and generate a particular recipe using a default configuration or a configuration specified by a user. For example, a staging recipe template can have the four commands of the task recipe 125 described above with reference to FIG. 1. The system can modify the arguments to the commands based on a requested configuration for a unit of computation provided by a user. For example, the system can generate a Download command having a download location of the unit of computation provided by the developer.

Each of the generated recipes includes a sequence of platform-independent, resource-agnostic commands. Example commands include Download, Upload, Run, and Log commands as described above with reference to FIG. 1. Other example commands include a FetchResult command that requests obtaining the contents of a file from a location in the underlying computing platform.

Some recipe commands act on other recipe commands. For example, a recipe can include a SerialAction command and a ParallelAction command that take as arguments other recipe commands.

The SerialAction command specifies a sequence of commands to be performed in a particular order. For example, to stage an application, a stager can generate a recipe that includes a SerialAction command with each of the steps of staging specified in sequence. An executor will then execute the commands serially by the specified sequence. To do so, the executor will translate each command into one or more platform-independent, resource-specific requests, and the executor makes the resource-specific requests for a second command of the SerialAction command only after all resource-specific requests for a first command of the SerialAction command have completed. However, an executor may make multiple resource-specific requests for a single command concurrently and in parallel A ParallelAction command specifies commands to be performed in parallel. For example, an application may require multiple build packs to be downloaded in order for the application to be compiled for execution in a particular underlying computing platform. Thus, a recipe can include a ParallelAction that specifies multiple Download commands, one for each of the required build packs. The ParallelAction command specifies that an executor can make resource-specific requests for the specified commands in parallel. In other words, the executor can make parallel requests to an execution engine to download the multiple build packs, which may result in the execution engine also downloading the build packs in parallel. In other words, In other words, the executor need not wait for resource-specific requests for a first command of the ParallelAction command to complete before making resource-specific requests for a second command of the ParallelAction command.

A Try command is a command that catches errors generated by a second command. For example, an executor can generate a platform-independent, resource-specific request that asks an execution engine to attempt to run the second command and ignore any failures.

The system directs an execution engine to perform operations satisfying the services requested by each of the platform-independent, resource-agnostic commands of the recipe (230).

For example, the system can provide the recipe to an executor that will translate each platform-independent, resource-agnostic command into one or more platform-independent, resource-specific requests. The platform-independent, resource-specific requests are requests to an execution engine to allocate resources and execute the unit of computation using the allocated resources.

The executor can then make requests to one or more execution engines installed on one or more underlying computing platforms. The execution engines will then perform platform-specific, resource instance-specific operations in response to the requests in order to satisfy the services requested by the platform-independent, resource-agnostic commands.

Figure 3:
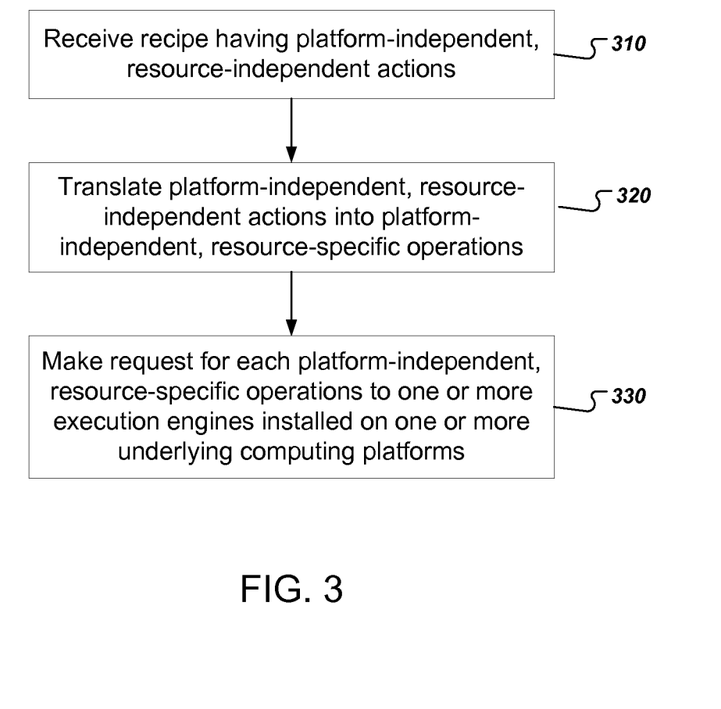
FIG. 3 is a flowchart of an example process for performing requests to carry out services requested by commands of recipes on one or more underlying computing platforms.

FIG. 3 is a flowchart of an example process for performing requests to carry out services requested by commands of recipes on one or more underlying computing platforms. The process can be implemented by one or more computer programs installed on one or more computers. The process will be described as being performed by an appropriately programmed system of one or more computers, e.g., the executor 150a as described above with reference to FIG. 1.

The system receives a recipe having platform-independent, resource-agnostic commands (310). For example, the system can receive a recipe that was generated automatically by a stager or a custom recipe written by a developer and provided to the system directly.

The system translates each platform-independent, resource-agnostic command in the recipe into one or more platform-independent, resource-specific requests (320). The requests generally relate to allocating and managing resources in an underlying computing platform. The requests can relate to allocating resources on a physical computer, a virtual machine, a container on a virtual machine, or some combination of these.

For example, for a Download command in the recipe that requests that a file be downloaded into the cloud computing system, the system can generate the following platform-independent, resource-specific requests.

Allocate(container_name)
Copy(downloaded_file, file_destination, container_name)

For convenience, these example requests will be described as operating on containers in an underlying computing platform. However, the same requests can also operate on any other appropriate resource type. For example, the cloud computing system can generate the same requests to operate on virtual machines.

The Allocate request requests that an execution engine perform a platform-independent, resource instance-specific operation to allocate a container on a particular underlying computing platform. The system may also generate additional requests that request setting resource limits for CPU, memory, and disk usage for the particular container. The system can also generate additional requests to configure networking for the allocated resources.

If a particular container is no longer needed, the system can generate a Delete request to delete a particular container.

The Copy request requests that the execution engine copy a file into the specified container.

If a particular container has already been allocated and started for the particular recipe, the requests may omit allocation requests. Thus, in some implementations, the system only allocates new resources for a first command of a recipe. Subsequent commands may not result in requests to allocate new resources.

As another example, the Run command in a recipe specifies that an executable application should be run in an allocated resource of an underlying computing platform. For example, after allocating a container, the system can generate the following resource-specific request, RunInContainer, that causes an execution engine to run the application within an allocated container:

RunInContainer(executable_application, container_name, args, environment_vars)

The RunInContainer request can also take arguments and environment variables for the executable application.

The RunInContainer request can return, to the executor, a representation of a process corresponding to the executable application in the container, which can be used by the executor to perform subsequent platform-independent, resource-specific requests. For example, the returned process representation can provide the executor access to a stream of output from the process being streamed by an execution engine hosting the process. The executor can then provide the stream of output to other components in the system, e.g., to a controller, which can forward the output to a user device.

The process representation also allows the executor to communicate with the process. For example, the executor can use the process representation to instruct the process to shut down.

The system makes a request for each of the platform-independent, resource-specific requests to one or more execution engines installed on one or more underlying computing platforms (330). For example, the system can make requests to a server hosted by an execution engine installed on a Linux-based underlying computing platform for each of the platform-independent, resource-specific requests. The execution engine can then perform platform-specific, resource instance-specific operations corresponding to the requests for the Linux-based underlying computing platform.

As another example, an execution engine installed on a particular computing platform can receive a request to allocate a container and, in response, perform a platform-specific, resource instance-specific operation to allocate a container on the particular computing platform.

As another example, an execution engine can receive a Copy request that specifies a location of a file and a container name. In response, the execution engine can perform platform-specific, resource instance-specific operations to copy the file from the specified file location into the specified file location on the specified container.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more first computers each of which is configured to implement one of a plurality of executors, each executor being configured to perform operations comprising:
receiving a recipe comprising one or more platform-independent, resource-agnostic commands, each command (i) being platform-independent by corresponding to a requested service to be performed by an execution engine on any one underlying computing platform from a plurality of multiple different underlying computing platforms and (ii) being resource-agnostic by corresponding to a requested service to be performed by an execution engine using any appropriate combination of resources on the any one underlying computing platform from the multiple different underlying computing platforms,
translating each platform-independent, resource-agnostic command of the recipe into one or more platform-independent, resource specific requests that satisfy the requested service on the underlying computing platform by directing an execution engine to operate on a resource in an underlying computing platform and providing each of the one or more platform-independent, resource-specific requests to one of the one or more execution engines using a platform-independent execution engine application programming interface (API); and
one or more second computers each of which have a particular instance of an underlying computing platform from the plurality of multiple different underlying computing platforms and is configured to implement one of a plurality of execution engines, each execution engine being configured to perform operations comprising:
receiving, through the execution engine API by a first execution engine of the plurality of execution engines installed on a second computer from the second computers having a first instance of a particular underlying computing platform from the plurality of multiple different underlying computing platforms, a first platform-independent, resource-specific request from an executor to allocate a resource in an underlying computing platform and in response, perform one or more platform-specific, resource instance-specific operations to allocate a first resource on the first instance of the particular underlying computing platform according to the first platform-independent, resource-specific request,
receiving, through the execution engine API by the first execution engine, a second platform-independent, resource-specific request from the executor to copy a target object into the first resource allocated on the first instance of the particular underlying computing platform and in response, perform one or more platform-specific, resource instance-specific operations to copy the target into the first resource allocated on the first instance of the particular underlying computing platform according to the second platform-independent, resource-specific request, and
receiving, through the execution engine API by the first execution engine, a third platform-independent, resource-specific request from the executor to execute a target executable within the first resource allocated on the first instance of the particular underlying computing platform and in response, perform one or more platform-specific, resource instance-specific operations to execute the target executable within the first resource allocated on the first instance of the particular underlying computing platform according to the third platform-independent, resource-specific request.

2. The system of claim 1, wherein each of the one or more second computers configured to implement one of the plurality of execution engines to cause the execution engine to host a respective server that receives requests from an executor to implement the execution engine API.

3. The system of claim 1, wherein at least two of the one or more second computers each comprise a different underlying computing platform.

4. The system of claim 1, wherein the first platform-independent, resource-specific request comprises a request to allocate a container in an underlying computing platform.

5. The system of claim 1, wherein a first computer from the one or more first computers that is configured to implement a first executor of the plurality of executors comprises a first underlying computing platform from the plurality of multiple different underlying computing platforms and a second computer from the one or more first computers that is configured to implement a second executor of the plurality of executors comprises a different second underlying computing platform from the plurality of multiple different underlying computing platforms, wherein both the first underlying computing platform and the second underlying computing platform are operable to generate a same plurality of platform-independent, resource-specific requests for a particular recipe.

6. The system of claim 1, wherein a first computer from the one or more first computers that is configured to implement a first executor of the plurality of executors is operable to cause the first executor to provide a same plurality of platform-independent, resource-specific requests to each of two execution engines implemented on different ones of the one or more second computers each of which has a different underlying computing platform.

7. The system of claim 6, wherein each of the two execution engines on different ones of the one or more second computers each of which has a different underlying platform performs different platform-specific, resource instance-specific operations to satisfy the same plurality of platform-independent, resource-specific requests.

8. The system of claim 1, wherein each of the plurality of multiple different underlying computing platforms comprises at least one of different hardware or different software than the other multiple different underlying computing platforms.

9. A computer-implemented method comprising:
processing, by each executor of a plurality of executors, a recipe comprising one or more platform-independent, resource-agnostic commands, each command (i) being platform-independent by corresponding to a requested service to be performed by an execution engine on any one underlying computing platform from a plurality of multiple different underlying computing platforms and (ii) being resource-agnostic by corresponding to a requested service to be performed by an execution engine using any appropriate combination of resources on the any one underlying computing platform from the multiple different underlying computing platforms, wherein each executor is installed on a first computer, including:
translating each platform-independent, resource-agnostic command of the recipe into one or more platform-independent, resource specific requests that satisfy the requested service on the underlying computing platform by directing an execution engine to operate on a resource in an underlying computing platform and providing each of the one or more platform-independent, resource-specific requests to one of the one or more execution engines using a platform-independent execution engine application programming interface (API); and
processing, by each execution engine of a plurality of execution engines, a plurality of platform-independent, resource-specific requests received from an executor, each execution engine being installed on a second computer having a particular instance of an underlying computing platform from the plurality of multiple different underlying computing platforms, including:
receiving, by the execution engine through the execution engine API, a first platform-independent, resource-specific request from an executor to allocate a resource in an underlying computing platform and in response, performing one or more platform-specific, resource instance-specific operations to allocate a first resource on the particular underlying computing platform of the second computer according to the first platform-independent, resource-specific request,
receiving, by the execution engine through the execution engine API, a second platform-independent, resource-specific request from the executor to copy a target object into the first resource allocated on the particular underlying computing platform of the second computer and in response, performing one or more platform-specific, resource instance-specific operations to copy the target into the first resource allocated on the particular underlying computing platform of the second computer according to the second platform-independent, resource-specific request, and
receiving, by the execution engine through the execution engine API, a third platform-independent, resource-specific request from the executor to execute a target executable within the first resource allocated on the particular underlying computing platform of the second computer and in response, performing one or more platform-specific, resource instance-specific operations to execute the target executable within the first resource allocated on the particular underlying computing platform of the second computer according to the third platform-independent, resource-specific request.

10. The method of claim 9, further comprising, hosting, by each execution engine, a respective server that receives requests from the executor to implement the execution engine API.

11. The method of claim 9, wherein at least two of the one or more second computers each comprise a different underlying computing platform.

12. The method of claim 9, wherein receiving, by the execution engine through the execution engine API, the first platform-independent, resource-specific request from an executor to allocate a resource in an underlying computing platform comprises receiving, by the execution engine through the execution engine API, a request to allocate a container in an underlying computing platform.

13. The method of claim 9, further comprising generating, by each of a first executor of the plurality of executors installed on a corresponding first computer with a first underlying computing platform and a second executor of the plurality of executors installed on a corresponding first computer with a different second underlying computing platform, a same plurality of platform-independent, resource-specific requests for a particular recipe.

14. The method of claim 9, further comprising providing, by a first executor of the plurality of executors, a same plurality of platform-independent, resource-specific requests to each of two execution engines installed on different ones of the one or more second computers each of which has a different underlying computing platform.

15. The method of claim 14, further comprising performing, by each of the two execution engines installed on different ones of the one or more second computers each of which has a different underlying platform, different platform-specific, resource instance-specific operations to satisfy the same plurality of platform-independent, resource-specific requests.

16. A computer program product, encoded on one or more non-transitory computer storage media, comprising instructions that when executed by one or more computers cause the one or more computers to perform operations comprising:

processing, by each executor of a plurality of executors, a recipe comprising one or more platform-independent, resource-agnostic commands, each command (i) being platform-independent by corresponding to a requested service to be performed by an execution engine on any one underlying computing platform from a plurality of multiple different underlying computing platforms and (ii) being resource-agnostic by corresponding to a requested service to be performed by an execution engine using any appropriate combination of resources on the any one underlying computing platform from the multiple different underlying computing platforms, wherein each executor is configured to be implemented on a first computer, including:

translating each platform-independent, resource-agnostic command of the recipe into one or more platform-independent, resource specific requests that satisfy the requested service on the underlying computing platform by directing an execution engine to operate on a resource in an underlying computing platform and providing each of the one or more platform-independent, resource-specific requests to one of the one or more execution engines using a platform-independent execution engine application programming interface (API); and processing, by each execution engine of a plurality of execution engines, a plurality of platform-independent, resource-specific requests received from an executor, each execution engine being configured to be implemented on a second computer having a particular instance of an underlying computing platform from the plurality of multiple different underlying computing platforms, including:

receiving, by the execution engine through the execution engine API, a first platform-independent, resource-specific request from an executor to allocate a resource in an underlying computing platform and in response, performing one or more platform-specific, resource instance-specific operations to allocate a first resource on the particular underlying computing platform of the second computer according to the first platform-independent, resource-specific request, receiving, by the execution engine through the execution engine API, a second platform-independent, resource-specific request from the executor to copy a target object into the first resource allocated on the particular underlying computing platform of the second computer and in response, performing one or more platform specific, resource instance-specific operations to copy the target into the first resource allocated on the particular underlying computing platform of the second computer according to the second platform-independent, resource-specific request, and receiving, by the execution engine through the execution engine API, a third platform-independent, resource-specific request from the executor to execute a target executable within the first resource allocated on the particular underlying computing platform of the second computer and in response, performing one or more platform-specific, resource instance-specific operations to execute the target executable within the first resource allocated on the particular underlying computing platform of the second computer according to the third platform-independent, resource-specific request.

17. The computer program product of claim 16, wherein the operations further comprise, hosting, by each execution engine, a respective server that receives requests from the executor to implement the execution engine API.

18. The computer program product of claim 16, wherein at least two of the one or more second computers each comprise a different underlying computing platform.

19. The computer program product of claim 16, wherein receiving, by the execution engine through the execution engine API, the first platform-independent, resource-specific request from an executor to allocate a resource in an underlying computing platform comprises receiving, by the execution engine through the execution engine API, a request to allocate a container in an underlying computing platform.

20. The computer program product of claim 16, wherein the operations further comprise generating, by each of a first executor of the plurality of executors configured to be implemented on a corresponding first computer with a first underlying computing platform and a second executor of the plurality of executors configured to be implemented on a corresponding first computer with a different second underlying computing platform, a same plurality of platform-independent, resource-specific requests for a particular recipe.

21. The computer program product of claim 16, wherein the operations further comprise providing, by a first executor of the plurality of executors, a same plurality of platform-independent, resource-specific requests to each of two execution engines configured to be implemented on different ones of the one or more second computers each of which has a different underlying computing platform.

22. The computer program product of claim 21, further comprising performing, by each of the two execution engines configured to be implemented on different ones of the one or more second computers each of which has a different underlying platform, different platform-specific, resource instance-specific operations to satisfy the same plurality of platform-independent, resource-specific requests.

* * * * *